Jan. 15, 1929.

R. S. MOORE 1,698,767

LIGHTING SYSTEM FOR VEHICLES

Filed Oct. 1, 1925

INVENTOR
Ralph S. Moore
BY
ATTORNEY

Patented Jan. 15, 1929.

1,698,767

UNITED STATES PATENT OFFICE.

RALPH S. MOORE, OF VISALIA, CALIFORNIA.

LIGHTING SYSTEM FOR VEHICLES.

Application filed October 1, 1925. Serial No. 59,802.

This invention relates to improvements in lighting systems for attachment to motor vehicles of the gear shift type. My principal object is to provide a light to be mounted on the rear end of the vehicle so as to shine rearwardly of the same, adapted to be lit only when the shift lever is moved to a reverse position.

The light is arranged to serve two purposes. It provides illumination on the road a short distance behind one of the rear wheels of the car, enabling the driver to see where he is driving after dark, as when backing down drive-ways or alleys, or when backing out from a parking place on a dark street; and also serves as a warning to the drivers of other vehicles of such rearward movement of the vehicle on which the light is mounted.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
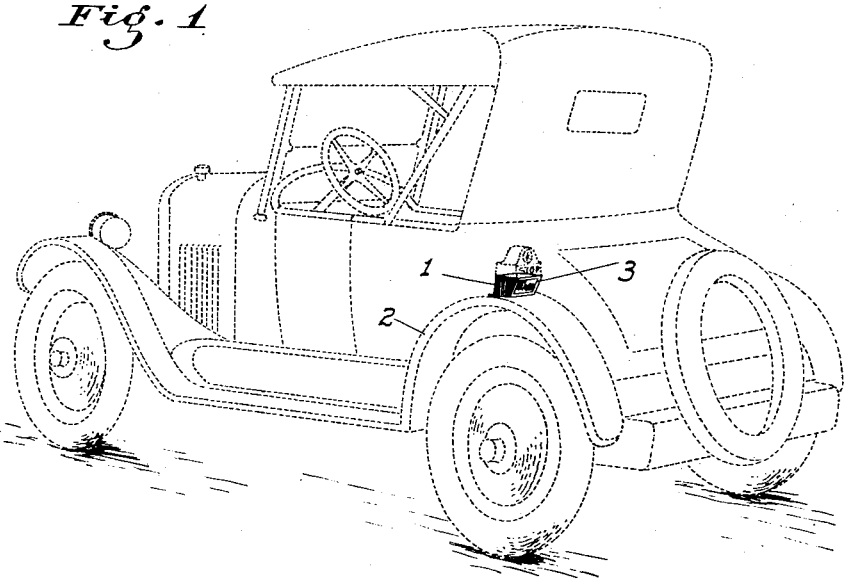
Fig. 1 is a perspective outline of an automobile showing my improved rear light as mounted thereon.

Referring now more particularly to the characters of reference on the drawings, the numeral 1 denotes a casing of suitable dimensions and design, adapted to be mounted on the left rear fender 2 of the vehicle. A lens 3 of translucent uncolored glass is mounted in the rear face of the casing, and a reflector 4 is mounted in the casing behind said lens with an electric light bulb 5 between the reflector and the lens. The lens and reflector are preferably set at an angle so that light projected through the lens from the reflector will be deflected toward the ground a short distance rearwardly of the car. The light employed is preferably of such strength as to provide a suitable illumination on the ground to the rear of the car, while the lens and reflector are designed to cause said light to be spread over the ground for an area suitable to enable the driver to see the road for a necessary distance behind the car to enable him to see where he is backing.

If desired, this rear light casing may be arranged as a unitary combination with the tail and stop light devices of the car, as indicated in Fig. 1, or it may be a casing by itself. This arrangement however is of course optional with the manufacturer.

Figure 3:
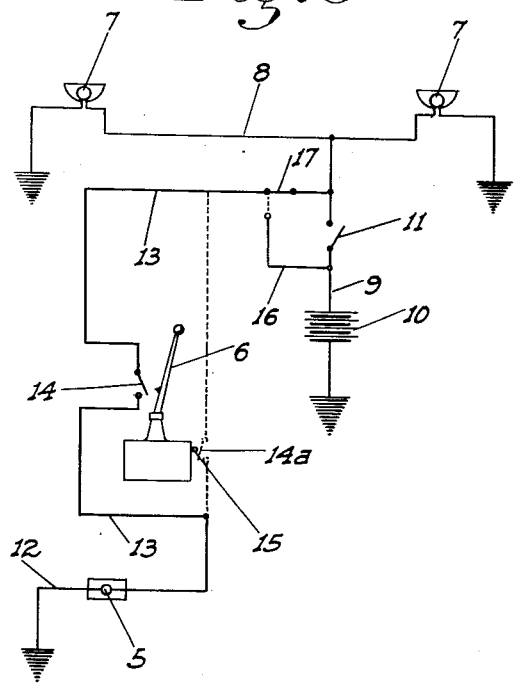
Fig. 3 is a diagram of the circuit and switch operating construction for such light.
Figure 2:
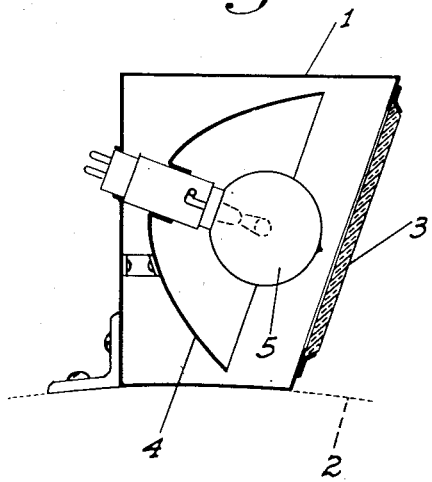
Fig. 2 is a cross section of the rear light casing.

The circuit to the bulb 5 is closed by moving the gear shift lever 6 of the car to a reverse position, and preferably only when the running lights of the car are turned on, in the manner as illustrated in the diagram in Fig. 3.

In such diagram 7 represents the headlights of the vehicle connected by a wire 8 from which a common lead 9 extends to the battery 10 of the car with the usual hand operated switch 11 interposed therein.

One lead 12 from the light 5 is grounded and the other lead 13 is connected to the lead 9 between the switch 11 and the wire 8, so that said lead 13 is only connected with the battery when the switch 11 is closed.

A switch 14 is interposed in said lead 13. This switch may be of a form positioned to be directly engaged and closed by the lever 6 when the latter is moved to a reverse position; or it may be of a type as at 14ª adapted to be engaged and closed by the shift fork rod 15 of the transmission when said rod is moved to a reverse position by a corresponding movement of the lever 6.

The use of either form of switch, or of any others which may be found suitable, depends upon the structural arrangement of parts of the different vehicles.

If desired a wire 16 may be connected to wire 9 between the battery and switch 11, with a double throw hand switch 17 associated therewith, this switch being arranged to either connect the wire 13 with wire 9, or to break such connection and form a connection between wire 13 and wire 16.

This enables a signal or warning light to be given in day time if desired, or whenever the running lights of the vehicle are not turned on.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful to secure by Letters Patent is:

A lamp construction for the purpose stated comprising a box adapted to fit on the rear fender of a motor vehicle and comprising substantially parallel top and bottom walls and a rear wall at right angles thereto, the top wall being of a greater width than the bottom wall whereby to cause the front wall to extend in a downwardly facing position, a lens in the front wall and a reflector in the box having its reflecting surface lying in a plan parallel to the plane of the lens.

In testimony whereof I affix my signature.

RALPH S. MOORE.